Oct. 25, 1966   K. O. KIRKER, JR   3,280,963
PLASTIC SCREW CONVEYOR AND METHOD OF MAKING SAME
Filed July 30, 1964

INVENTOR.
KENNETH O. KIRKER, JR
BY Charles A. Blank
ATTORNEY

United States Patent Office 3,280,963
Patented Oct. 25, 1966

3,280,963
PLASTIC SCREW CONVEYOR AND METHOD OF MAKING SAME
Kenneth O. Kirker, Jr., Baton Rouge, La., assignor to United States Rubber Company, New York, N.Y., a corporation of New Jersey
Filed July 30, 1964, Ser. No. 386,138
6 Claims. (Cl. 198—213)

This invention relates to plastic screw conveyors and to methods of making plastic screw conveyors. More particularly, the invention relates to methods of making screw conveyors of, for example, polytetrafluoroethylene, polyethylene, polypropylene, rubber-resins such as acrylonitrile-butadiene-styrene, polyamide resins, or other suitable plastic materials. Plastic screw conveyors constructed in accordance with the invention have the advantages of the superior properties of plastics including corrosion resistance, self-lubrication and non-adherence to materials being conveyed, and are economical to manufacture.

Plastic screw conveyors are ordinarily manufactured by machining or molding a cylindrical rod to form helical flights. The material removed from the rod between flights during machining represents a substantial loss. The costs of molding operations are substantial due to high mold costs and custom design requirements. Various methods have previously been utilized for manufacturing metal screw conveyors in which helical members are attached to central supporting rods by welding.

It is an object of the present invention, therefore, to provide a new and improved method of manufacturing a plastic screw conveyor which avoids one or more of the above-mentioned disadvantages of such prior methods.

It is another object of the present invention to provide a new and improved method of manufacturing a screw conveyor of polytetrafluoroethylene or other suitable plastic materials in which waste material is minimized.

It is another object of the invention to provide a new and improved plastic screw conveyor.

In accordance with the present invention, a method of making a plastic screw conveyor comprises forming a first plastic member having a substantially cylindrical longitudinal surface with a groove therein extending helically and longitudinally of the member, forming a plastic tubular helical member having an inner diameter substantially equal to the root diameter of the first member and having a width substantially the same as the width of the groove, and screwing the first member and the helical member relatively together to seat the helical member in the groove to form a screw conveyor.

For a better understanding of the present invention, together with other and further objects thereof, reference is made to the following description taken in connection with the accompanying drawings, and its scope will be pointed out in the appended claims.

Referring to the drawings.

Figure 1:
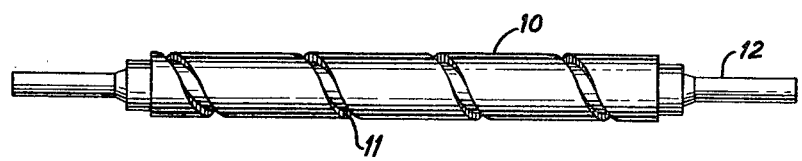
FIG. 1 is a plan view of a plastic cylindrical member mounted on a shaft to form the body of the screw conveyor.

Referring now more particularly to FIG. 1 of the drawings, there is represented a first plastic member 10 having a substantially cylindrical longitudinal surface with a groove 11 therein extending helically and longitudinally of the member 10. The method of making the plastic screw conveyor comprises forming the first plastic member 10 with groove 11 therein by, for example, helically machining the groove in a cylindrical tubular body 10 of polytetrafluoroethylene or other suitable plastic material. The groove may also be formed by, for example, forming the member 10 in a mold. The cylindrical member 10 preferably is mounted on a metal shaft or tube 12 and may be attached thereto by any suitable means such as by a force fit on a knurled shaft.

Figure 2:
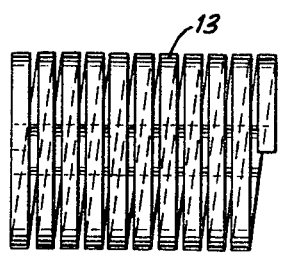
FIG. 2 is a plan view of a second tubular member, after helical cutting, adapted to form the flights of the screw conveyor.

The method also comprises the step of forming a plastic tubular helical member 13, represented in FIG. 2 as having an inner diameter substantially equal to the root diameter of the body member 10 and having a flight width substantially the same as the width of the groove 11. The member 13 preferably is formed by helically cutting or parting a suitable tubular body on a lathe with a suitable tool.

Figure 3:
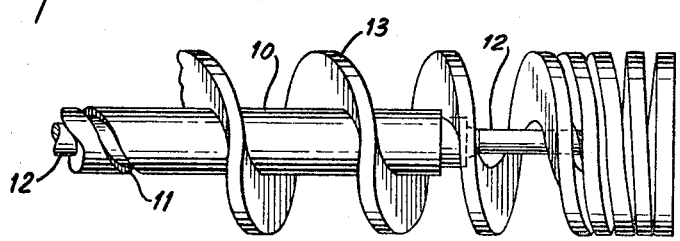
FIG. 3 is a fragmentary plan view of the FIG. 2 helical member partially screwed onto the FIG. 1 member.

The method of the invention also comprises the step of screwing the body member 10 and the helical member 13 relatively together to seat the helical member 13 in the groove 11 to form the screw conveyor. As represented in FIG. 3, as the member 13 is screwed onto the member 11, the flights spread apart, causing a stress of torsion and tension in the flights which stiffens the flights and decreases slightly the inner diameter of the helical member 11 to cause the flights to grip the root of the member 10 firmly. The step of screwing the helical member 13 and the body member 10 firmly together is particularly adapted for attaching plastic flights to a plastic body member. Preferred plastic materials are polytetrafluorethylene, polyethylene, and polypropylene. Polytetrafluorethylene has the smallest coefficient of friction of the three materials, of the order of 0.04. If desired, a suitable lubricant may be utilized to aid in screwing the members 10 and 13 together.

Figure 4:
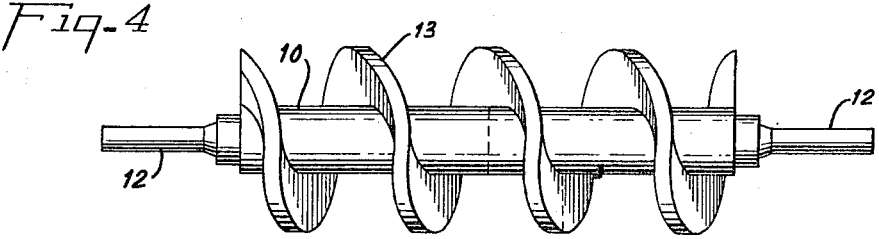
FIG. 4 is a plan view of the screw conveyor in assembled form.

As represented in FIG. 4, when the helical member 13 and the member 10 are joined, the helical member 13 extends over the body of the member 10 to form a screw conveyor in which the helical member 13 has a pitch corresponding to the pitch of the groove 11.

As represented in FIG. 2, the helical member 13 has a natural pitch less than the pitch of the groove 11. The member 13 is sufficiently resilient that the member 13 can be screwed onto a body member having a groove with a pitch which is several times greater than the natural pitch of the helical member 13. The exact relation of the two pitches is not critical and the helical member 13 can be seated in a groove having a different pitch from the groove 11. The helical member 13 may be cut to desired length before or after attachment to the body member 10. If desired, suitable attachments (not shown) to the shaft may be utilized at the ends of the plastic members 10 and 13 to aid in preventing longitudinal and radial movement on the shaft during operation. The member 13 may be heat fused or sealed to the body member 11 or may remain unfused so that the members can be unscrewed and renewed by screwing on a replacement if desired.

The method of the present invention is particularly suitable for manufacturing screw conveyors for feeding, for example, granular material, powder, slurry, emulsions, suspensions, dispersions and the like. Such conveyors may be of a wide range of sizes, extending, for example, to several feet in length and a foot or more in flight diameter. Conveyors of greater length may be made by mounting sections, such as portions of tubular member 10 in butting longitudinal relation on the same shaft and screwing one or more helical members such as member 13 into the mating grooves of the sections 10. Such a conveyor would also be represented by FIG. 3 in which the broken-lines represent the butted edges of body portions and flight portions.

The screw conveyor ordinarily may be mounted in a suitable housing (not shown) preferably having a plastic surface adjacent the flights of the screw conveyor.

While there have been described what are at present believed to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. The method of making a plastic screw conveyor comprising forming a first plastic member having a substantially cylindrical longitudinal surface with a groove therein extending helically and longitudinally of the member, forming a plastic tubular helical member having continuous multiple flights and having an inner diameter substantially equal to the root diameter of the first member and having a width substantially the same as the width of the groove, and threading the flights of the helical member into the groove of the first member to seat the helical member in the groove to form a screw conveyor.

2. The method in accordance with claim 1, in which the step of forming the first plastic member comprises the step of cutting in the cylindrical surface of the first plastic member a groove extending helically of the first plastic member.

3. The method of making a plastic screw conveyor comprising forming a first plastic member having a substantially cylindrical longitudinal surface with a groove therein extending helically and longitudinally of the member, helically cutting a plastic tubular member having an inner diameter substantially equal to the root diameter of the first member and having a width substantially the same as the width of the groove to form a helical member having continuous multiple flights, and threading the flights of the helical member into the groove of the first member to seat the helical member in the groove to form a screw conveyor.

4. The method in accordance with claim 3 in which the step of cutting the plastic tubular member comprises the step of helically cutting the plastic tubular member at a natural pitch less than the pitch of the helical groove of the first plastic member.

5. A plastic screw conveyor comprising a first plastic member having a substantially cylindrical longitudinal surface with a groove therein extending helically and longitudinally of the member, said groove having a predetermined pitch, and a plastic helical member seated in the groove and having an inner diameter substantially equal to the root diameter of the first member and having a width substantially the same as the width of said groove and having a natural pitch less than the pitch of said groove, whereby said helical member is maintained under tension in said groove to form a screw conveyor.

6. A plastic screw conveyor in accordance with claim 5 in which said plastic helical member has a diameter substantially the same as the root diameter of said first member.

References Cited by the Examiner
UNITED STATES PATENTS

| | | | |
|---|---|---|---|
| 1,883,795 | 10/1932 | Kannee | 198—213 |
| 1,939,080 | 12/1933 | Pickard | 198—213 X |
| 2,760,255 | 8/1956 | Compton | 198—213 X |

EVON C. BLUNK, *Primary Examiner.*

SAMUEL F. COLEMAN, *Examiner.*

R. E. KRISHER, *Assistant Examiner.*